No. 810,994. PATENTED JAN. 30, 1906.
J. STUART.
CONNECTING ROD FOR ENGINES.
APPLICATION FILED SEPT. 23, 1905.
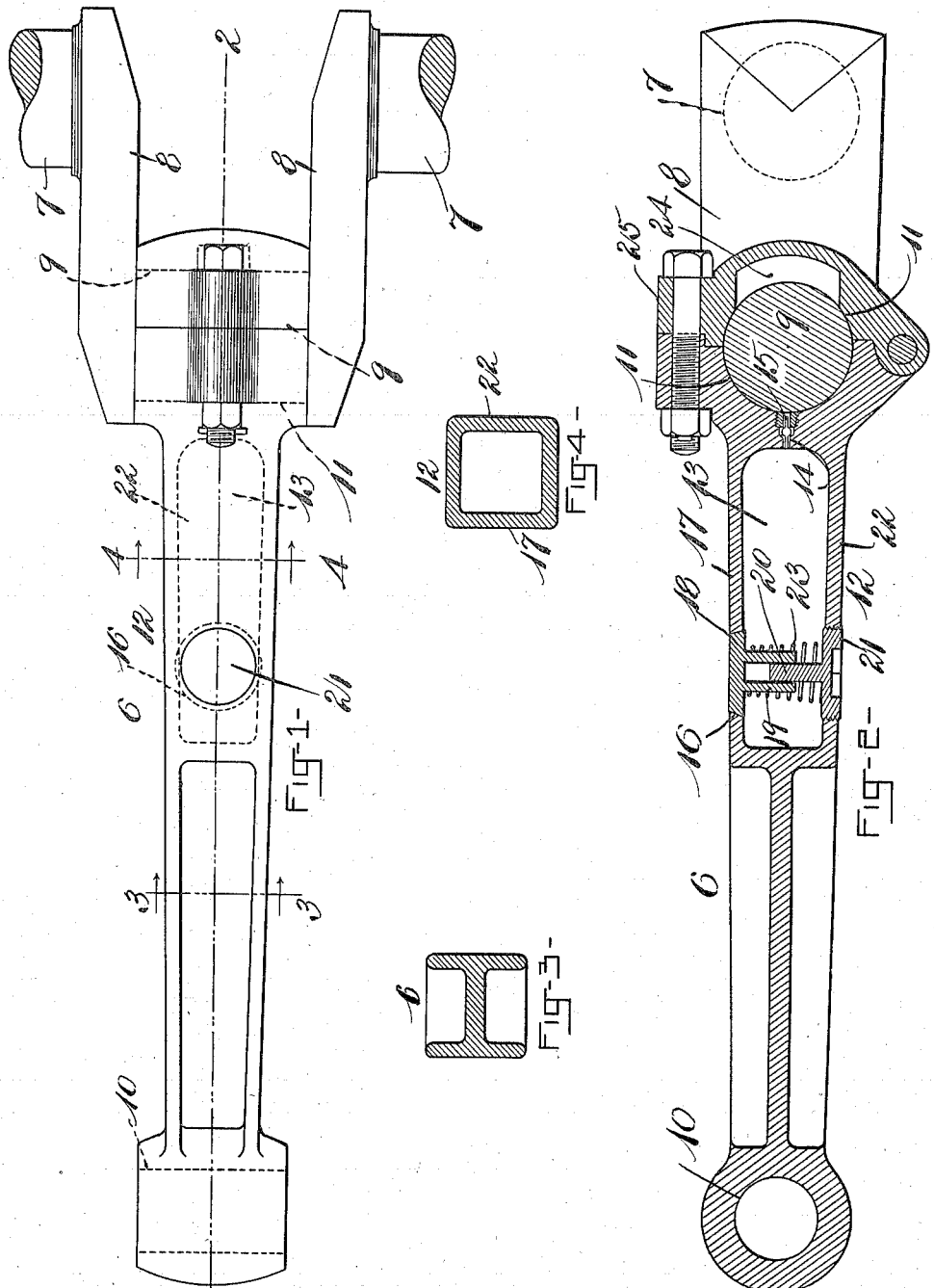

UNITED STATES PATENT OFFICE.

JOHN STUART, OF WOLLASTON, MASSACHUSETTS.

CONNECTING-ROD FOR ENGINES.

No. 810,994.　　　Specification of Letters Patent.　　　Patented Jan. 30, 1906.

Application filed September 23, 1905. Serial No. 279,790.

*To all whom it may concern:*

Be it known that I, JOHN STUART, a citizen of the United States, residing at Wollaston, in the county of Norfolk and State of Massachusetts, have invented new and useful Improvements in Connecting-Rods for Engines, of which the following is a specification.

This invention relates to connecting-rods for engines, and is particularly adapted to connecting-rods for high-speed gasolene-engines.

The object of the invention is to provide a connecting-rod which comprises in its construction a convenient means for lubricating the crank-pin of the crank-shaft to which one end of said connecting-rod is attached, and to this end the connecting-rod is provided with a chamber adapted to contain lubricating material in solid form, such as grease, and connected by an outlet-passage at one end thereof with the bearing formed in the adjacent end of said connecting-rod and encircling the crank-pin, and also provided with an inlet-orifice constructed to enable the grease to be readily inserted in said chamber, and after being inserted means to lock the orifice through which it is inserted, so that the same cannot leak out of the chamber.

The invention consists in the combination and arrangement of parts set forth in the following specification, and particularly pointed out in the claims thereof.

Referring to the drawings, Figure 1 is a side elevation of a connecting-rod constructed in accordance with my invention, showing the same connected to the crank-pin of a crank-shaft. Fig. 2 is a section, partly in elevation, taken on line 2 2 of Fig. 1. Fig. 3 is a transverse section of the connecting-rod, taken on line 3 3 of Fig. 1. Fig. 4 is a transverse section of the connecting-rod, taken on line 4 4 of Fig. 1.

Like numerals refer to like parts throughout the several views of the drawings.

In the drawings, 6 is my improved connecting-rod; 7, a portion of a crank-shaft of an engine; 8 8, the crank-arms, and 9 the crank-pin. The connecting-rod 6 has bearings 10 and 11, formed in the opposite ends thereof, respectively. At the end adjacent to the crank-pin 9 said connecting-rod is made rectangular in cross-section, as shown in Fig. 4, for a portion of its length, the remainder of its length being ribbed to form an eye-beam structure, such as illustrated in Fig. 3. The rectangular portion 12 of said connecting-rod is provided with a chamber 13, extending longitudinally thereof. One end of said chamber is connected to the bearing 11 by an outlet-passage 14, in which is located a check-valve 15 of any suitable construction. Adjacent to the opposite end of said chamber from that in which said check-valve is located a supply-passage 16 is provided, which extends through one of the walls 17 of said chamber. Said supply-passage is preferably cylindrical and is inclined or beveled to form a seat for a conical-shaped valve 18, which has a hollow cylindrical stem 19 fast thereto and projecting into the chamber 13 and engaging a cylindrical shank 20, which is integral with a cylindrical plug 21, having screw-threaded engagement with the wall 22 of the chamber 13. A spiral spring 23 encircles the hollow stem 19 and also the cylindrical shank 20 and bears at one end against the valve 18 and at the other end thereof against the plug 21, thus holding said valve 18 normally closed or in the position illustrated in Fig. 2.

Grease is conveniently and neatly inserted in a solid form in the interior of the chamber 13 by means of an ordinary piston force-pump, the end of which is placed against the outer side of the valve 18, and by pressing with the pump against the valve said valve is forced downwardly into the chamber 13, the spring 23 yielding under pressure and allowing the valve 18 to slide upon the shank 20 until the end of the pump passes through the supply-passage 16 into the interior of the chamber 13, when by forcing the piston lengthwise of the pump the grease contained in the pump-cylinder is forced through orifices provided in said cylinder at the end thereof into the interior of the chamber 13. As soon as said chamber is filled by this means with grease the pump is withdrawn and the valve is closed by means of the spring 23, thus sealing the supply-passage 16 so that none of the grease in the chamber 13 can leak out thereof. The grease passes through the outlet-passage 14 and by the check-valve 15 to the bearing 11, where it becomes liquefied and lubricates the crank-pin 9. By this means high-speed engine crank-shafts may be lubricated with grease, so that they may be run at high speed without heating and the exterior of the connecting-rod and adjacent parts be free from any superfluous grease or oil.

It is evident that while I prefer using a valve such as hereinbefore described the supply-passage 16 may be closed by other means, such as a screw-plug, without departing from the spirit of my invention.

In order to still further lubricate the crank-pin 9, a pocket 24 is provided in the cap 25, said pocket opening inwardly upon the periphery of the crank-pin 9, and as the grease passes from the chamber 13 to the crank-pin, as hereinbefore described, a portion of it passes around upon the periphery of said crank-pin and clears in the pocket 24, so that there is always a fresh supply of grease upon both sides of the crank-pin to prevent the same from becoming heated during the rapid rotation thereof.

Having thus described my invention, what I claim, and desire by Letters Patent to secure, is—

1. A connecting-rod for engines provided with a chamber extending longitudinally thereof and with an outlet-passage leading out of one end thereof into a bearing formed upon said connecting-rod, together with a supply-passage extending through one of the side walls of said chamber, a valve located in said supply-passage, and a spring in said chamber, one end bearing against said valve.

2. A connecting-rod for engines provided with a chamber extending longitudinally thereof and with an outlet-passage leading out of one end thereof into a bearing formed upon said connecting-rod, together with a supply-passage extending through one of the walls of said chamber, a valve located in said supply-passage, a screw-plug in one wall of said chamber in the opposite side thereof from that in which said valve is located, said plug being in alinement with said valve, there being a shank on said plug projecting into said chamber, and a spring in said chamber one end bearing against said valve the other end encircling said shank and bearing against said plug.

3. A connecting-rod for engines having a bearing formed in each of its opposite ends, a portion of said rod adjacent to one of said bearings rectangular in cross-section and provided with a chamber extending longitudinally thereof, one end of said chamber connected to said bearing by an outlet-passage, a check-valve in said outlet-passage, the other end of said chamber provided with a supply-passage extending through one of the walls of said chamber, a valve located in said supply-passage, a screw-plug in one wall of said chamber on the opposite side thereof from that in which said valve is located, said screw-plug being in alinement with said valve, there being a shank on said plug projecting into said chamber, and a spring in said chamber, one end of said spring bearing against said valve, the other end encircling said shank and bearing against said plug.

4. A connecting-rod for engines provided with a chamber extending longitudinally thereof and with an outlet-passage leading out of one end thereof into a bearing formed upon said connecting-rod, together with a supply-passage extending through one of the walls of said chamber, means to close said supply-passage, a cap fast to said connecting-rod in which a portion of said bearing is formed, and a pocket adapted to contain lubricating material located in said cap and opening inwardly therefrom into said bearing.

In testimony whereof I have hereunto set my hand in presence of two subscribing witnesses.

JOHN STUART.

Witnesses:
CHARLES S. GOODING,
ANNIE J. DAILEY.